US008635780B1

(12) United States Patent
Abul

(10) Patent No.: US 8,635,780 B1
(45) Date of Patent: Jan. 28, 2014

(54) UTENSIL ATTACHMENTS FOR PORTABLE KNIFE ASSEMBLY

(71) Applicant: Abdulqader Habeeb Hussain Abul, Zahra (KW)

(72) Inventor: Abdulqader Habeeb Hussain Abul, Zahra (KW)

( * ) Notice: Subject to any disclaimer, the term of this patent is extended or adjusted under 35 U.S.C. 154(b) by 0 days.

(21) Appl. No.: 13/919,931

(22) Filed: Jun. 17, 2013

(51) Int. Cl.
*A47J 43/28* (2006.01)
*B26B 11/00* (2006.01)

(52) U.S. Cl.
USPC .................................. 30/147; 30/125; 30/143

(58) Field of Classification Search
USPC .......................... 30/143, 147, 340, 342; 7/118
See application file for complete search history.

(56) References Cited

U.S. PATENT DOCUMENTS

| | | | | | |
|---|---|---|---|---|---|
| 515,742 | A | * | 3/1894 | Von Bultzingslowen | 279/35 |
| 596,096 | A | * | 12/1897 | Watts | 7/118 |
| 610,530 | A | * | 9/1898 | Hammesfahr | 81/3.35 |
| 634,336 | A | * | 10/1899 | Greer | 7/118 |
| 637,048 | A | * | 11/1899 | Toulotte | 81/3.35 |
| 673,153 | A | * | 4/1901 | Baseler | 81/3.57 |
| 736,524 | A | * | 8/1903 | Kaufmann | 30/161 |
| 858,131 | A | * | 6/1907 | Aichele | 81/490 |
| 1,282,875 | A | | 10/1918 | Kupec | |
| 1,341,153 | A | | 5/1920 | Parker at al. | |
| 1,372,325 | A | | 3/1921 | Willemin | |
| 2,048,603 | A | * | 7/1936 | Fancher | 30/171 |
| 2,456,858 | A | | 12/1948 | Bolling | |
| 2,503,643 | A | * | 4/1950 | Verbrugge | 366/129 |
| 4,030,194 | A | * | 6/1977 | Hendricks | 30/143 |
| 4,539,749 | A | | 9/1985 | Hyeong-Woon | |
| 4,805,250 | A | | 2/1989 | Dugas | |
| 4,870,754 | A | * | 10/1989 | Chiou | 30/123 |
| D364,327 | S | | 11/1995 | Graham | |
| 5,762,344 | A | * | 6/1998 | Einvall | 279/96 |
| 6,055,733 | A | * | 5/2000 | Chen | 30/142 |
| 6,408,525 | B1 | * | 6/2002 | Marttiini | 30/340 |
| 6,601,306 | B1 | * | 8/2003 | Lombardi | 30/517 |
| 6,782,626 | B1 | * | 8/2004 | Gibbs | 30/342 |
| D612,692 | S | | 3/2010 | Menceles | |
| 2006/0207112 | A1 | | 9/2006 | Dunn et al. | |
| 2008/0276466 | A1 | * | 11/2008 | Currie | 30/327 |

FOREIGN PATENT DOCUMENTS

| | | |
|---|---|---|
| FR | 2 760 955 | 9/1998 |

* cited by examiner

*Primary Examiner* — Hwei C Payer
(74) *Attorney, Agent, or Firm* — Richard C. Litman

(57) ABSTRACT

The utensil attachments for a portable knife assembly include at least one utensil attachment having an elongate handle and a working section disposed at the distal end thereof. The working section can be in the shape of eating utensils, such as a spoon bowl or fork tines. An elongate, hollow connection socket is formed inside the handle and constructed to mount the utensil attachment to an existing corkscrew in the knife assembly. When assembled, the relatively large, elongate body of the knife assembly provides an easy to manipulate ergonomic handle requiring minimal physical effort from the disabled or those with limited motor control.

9 Claims, 4 Drawing Sheets

UTENSIL ATTACHMENTS FOR PORTABLE KNIFE ASSEMBLY

BACKGROUND OF THE INVENTION

1. Field of the Invention

The present invention relates to handicap aids, and particularly to utensil attachments for a portable knife assembly in order to aid users of limited motor control to easily operate utensils.

2. Description of the Related Art

Amongst those with physical disability due to age, accident or disease, many suffer from lack of full motor control of their limbs. This hampers their mobility in varying degrees, which prevents them from enjoying regular normal activities, such as walking or picking up objects. Many medical devices have been developed and designed to assist the physically disabled. These range from simple handheld devices to prosthetics or braces with complicated articulating components.

The need to feed is a common concern and daily aspect of life. It is common knowledge that one must eat to survive, nourish and maintain physical well-being. In many areas of the world, the act of dining requires the use of eating utensils such as spoons, forks, and/or knives. However, those with physical disability in the hands and/or arms may lack the dexterity or strength to handle these utensils effectively.

One solution involves large ergonomic handles applied to these types of utensils. The larger handle is of greater size than in conventional eating utensils. The larger size reduces the finer motor control necessary when using conventional forks, spoons and/or knives, and it also reduces the strength required to grip the utensil effectively. However, such utensils for the disabled are mostly confined to use at home, domicile or caregiver institutions such as hospitals and assisted living resorts. Most public dining facilities and restaurants do not have these types of utensils available, and it would be an inconvenience for the more active disabled to carry these utensils everywhere.

Another solution involves a multi-function tool, such as a portable knife assembly, that includes an integrated spoon and fork. The eating utensils can be selectively folded out for use. These are typically more ubiquitous as camping equipment, but they are also utilized by the disabled. They provide various benefits, such as a portable implement that can be employed anywhere, and some may include additional tools. However, due to some of the limited choice of tools included in such a device, a user may need to carry an additional multi-function tool for the user's potential needs.

Thus, utensil attachments for portable knife assembly solving the aforementioned problems are desired.

SUMMARY OF THE INVENTION

The utensil attachments for a portable knife assembly include at least one utensil attachment having an elongate handle and a working section disposed at the distal end thereof. The working section can be in the shape of eating utensils, such as a spoon bowl or fork tines. An elongate, hollow connection socket is formed inside the handle and constructed to mount the utensil attachment to an existing corkscrew in the knife assembly. When assembled, the relatively large, elongate body of the knife assembly provides an easy to manipulate ergonomic handle requiring minimal physical effort from the disabled or those with limited motor control.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
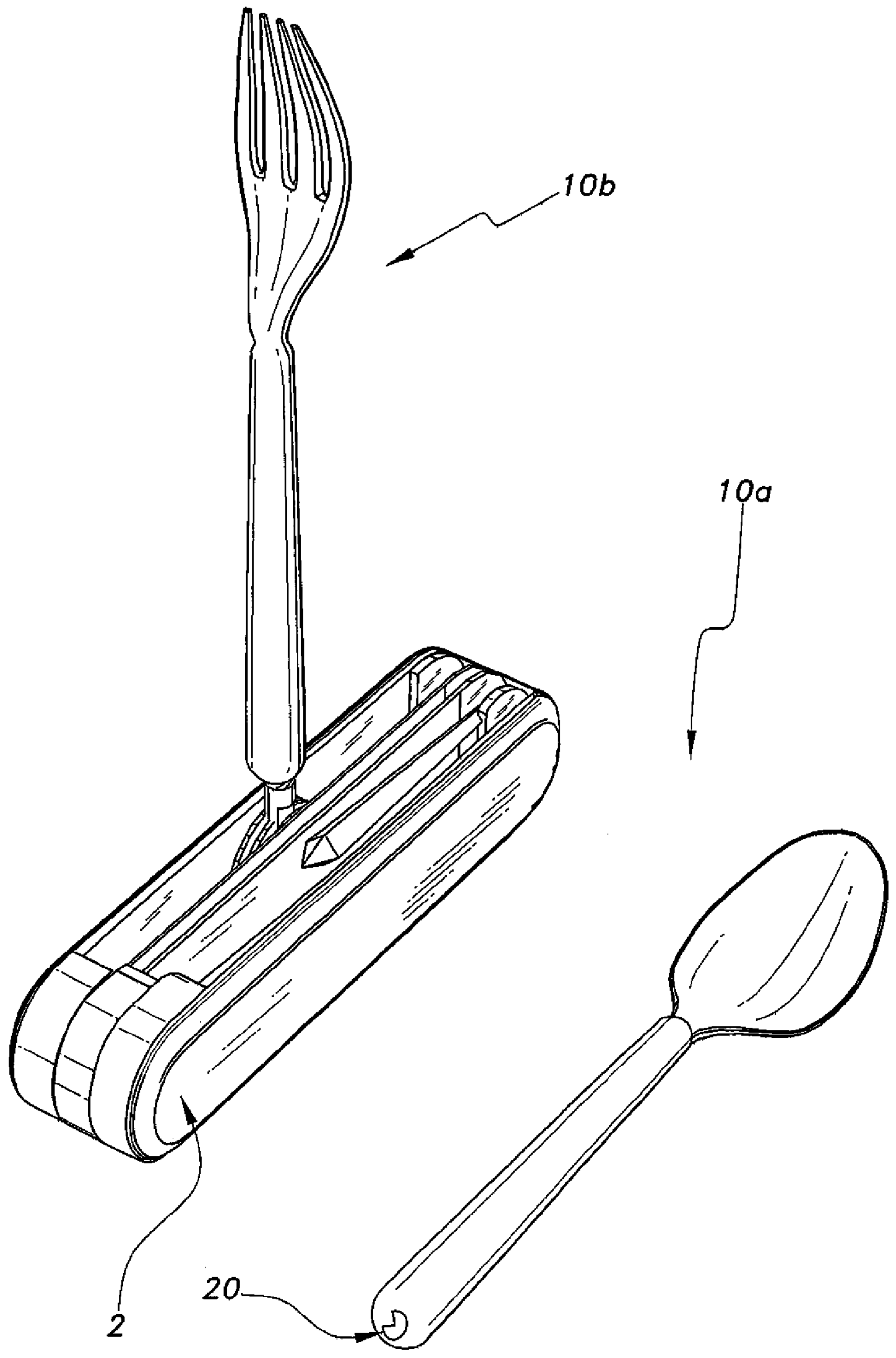
FIG. 1 is an environmental, perspective view of utensil attachments for a portable knife assembly according to the present invention.
Figure 2A:
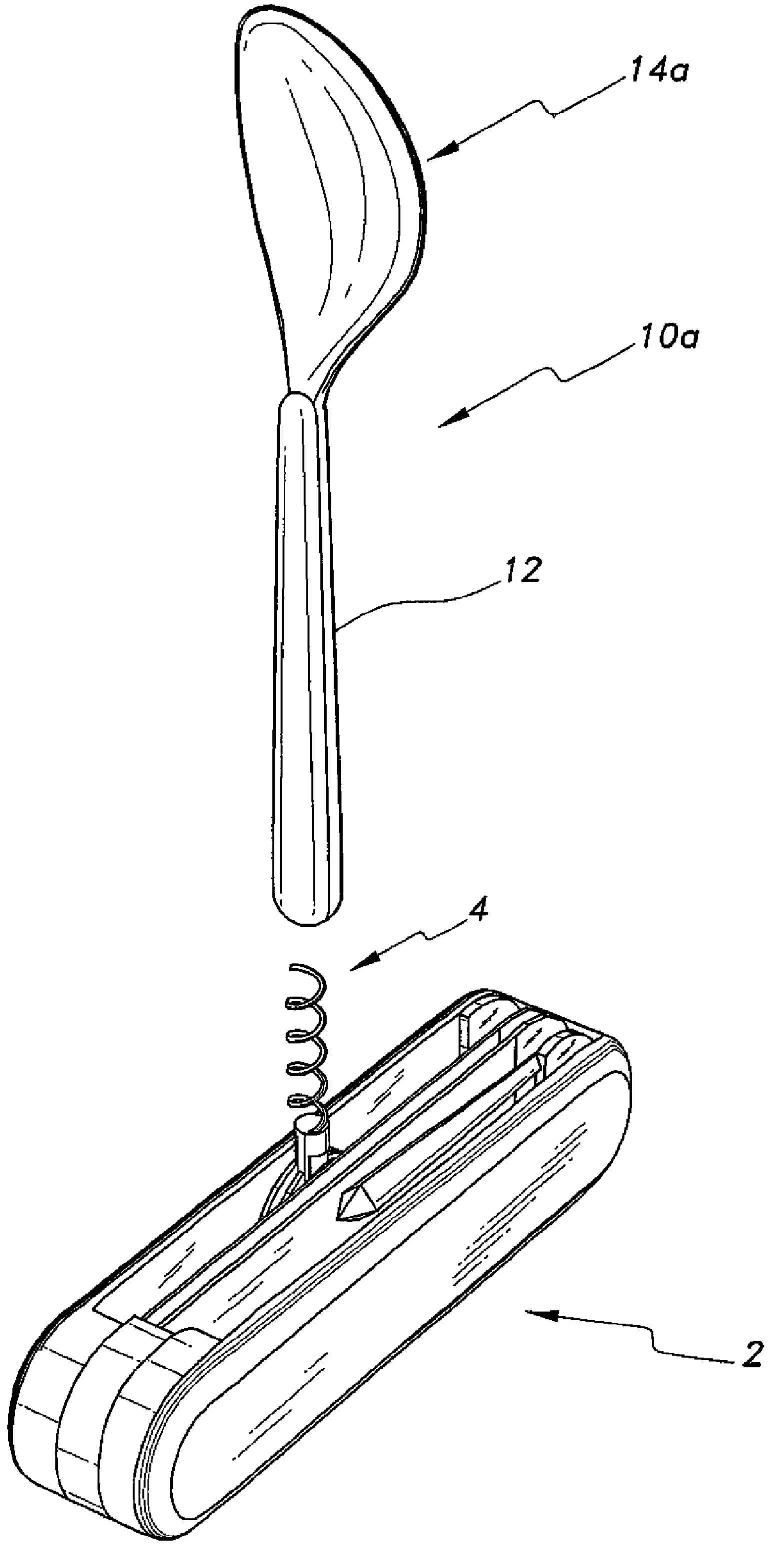
FIG. 2A is an exploded environmental perspective view of a spoon utensil attachment for the portable knife assembly of FIG. 1.
Figure 2B:
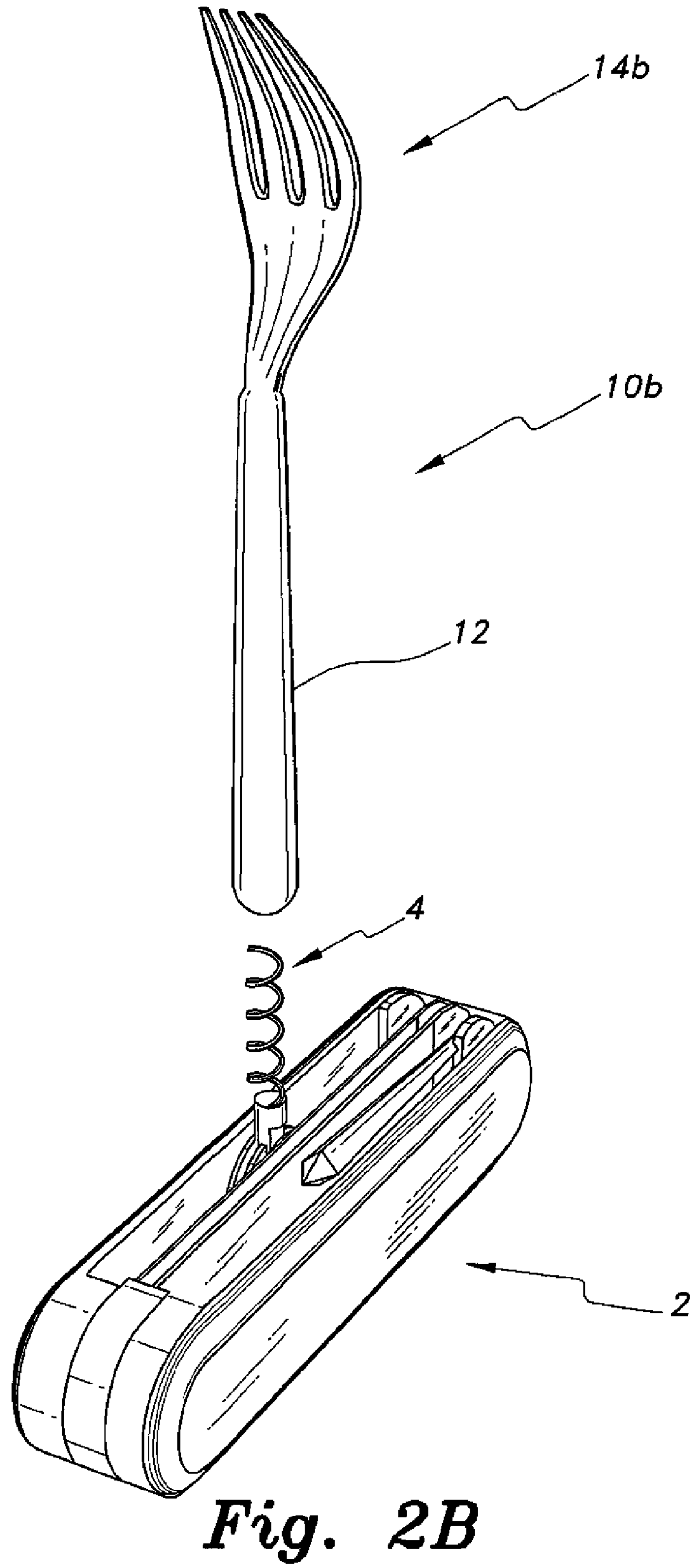
FIG. 2B is an exploded environmental perspective view of a fork utensil attachment for the portable knife assembly of FIG. 1.

The utensil attachments for portable knife assembly, generally referred to by the reference numbers 10*a* and 10*b* in the drawings, provides convenient use of utensils in any environment with minimal physical effort. The utensil attachment 10*a*, 10*b* can also be referred to as a utensil adapter. As best seen in FIGS. 1, 2A and 2B, the utensil attachments 10*a*, 10*b* for a portable knife assembly include a spoon utensil 10*a* and a fork utensil 10*b*. Each eating utensil attachment 10*a*, 10*b*, is constructed to be mounted to a portable knife assembly 2. An example of such knife assemblies includes a Swiss Army® knife ("Swiss Army" is a registered trademark of Wenger S. A. of Delemont Switzerland and Victorinox A. G. of Ibach-Schwyz, Switzerland), which is easily carried in a user's pocket or belt and any other pocket knife or similar device that includes at least one knife or tool folded or extended from a housing. Amongst the many tools provided in such knife assemblies, majority of these devices also include a corkscrew 4. The present utensil attachments 10*a*, 10*b* have been constructed to be mounted to such an existing corkscrew tool 4.

As best seen in FIGS. 2A, 2B, 3A and 3B, each utensil attachment 10*a*, 10*b* (viz., a spoon utensil attachment 10*a* and a fork utensil attachment 10*b*) includes an elongate handle 12 and a working section 14*a*, 14*b*, e.g., a spoon bowl 14*a* for the spoon utensil attachment 10*a* and a fork head 14*b* for the fork utensil attachment 10*b*, disposed at a distal end thereof. Each handle 12 includes a hollow connection section, bore or socket 20 in the form of an elongate, substantially blind bore. The connector socket 20 is shaped to securely receive a corkscrew or corkscrew tool 4 of the knife assembly 2. The entry opening of the connection socket 20 includes a lip 22 that provides an abutment for initiating the spiraling, screw action of the corkscrew tool 4. The lip 22 also prevents inadvertent disengagement of the utensil attachment 10*a*, 10*b* from the corkscrew tool 4 during use. In other words, an entry opening is formed in the proximal end of the handle 12. The elongate connection socket 20 extends from the entry opening toward the distal end, along the longitudinal axis of, and within the handle 12. The lip extends into the entry opening and forms an acute angle with the longitudinal axis of the elongate connection socket 20.

Figure 3A:
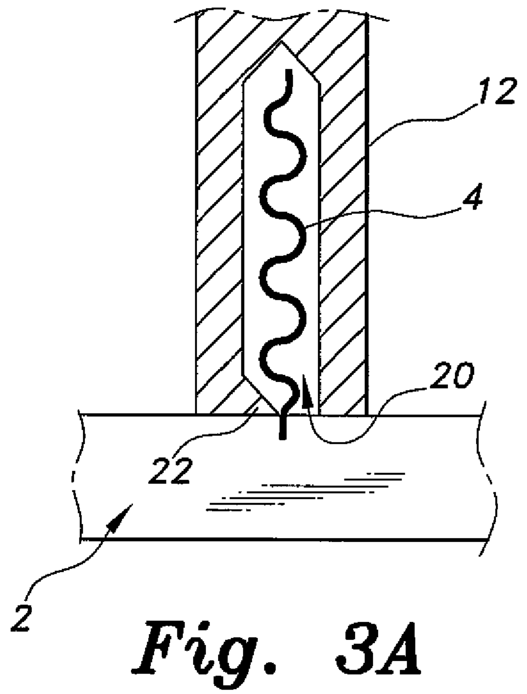
FIG. 3A is a partial side view in section of the connection socket for the utensil attachments for a portable knife assembly according to the present invention.
Figure 3B:
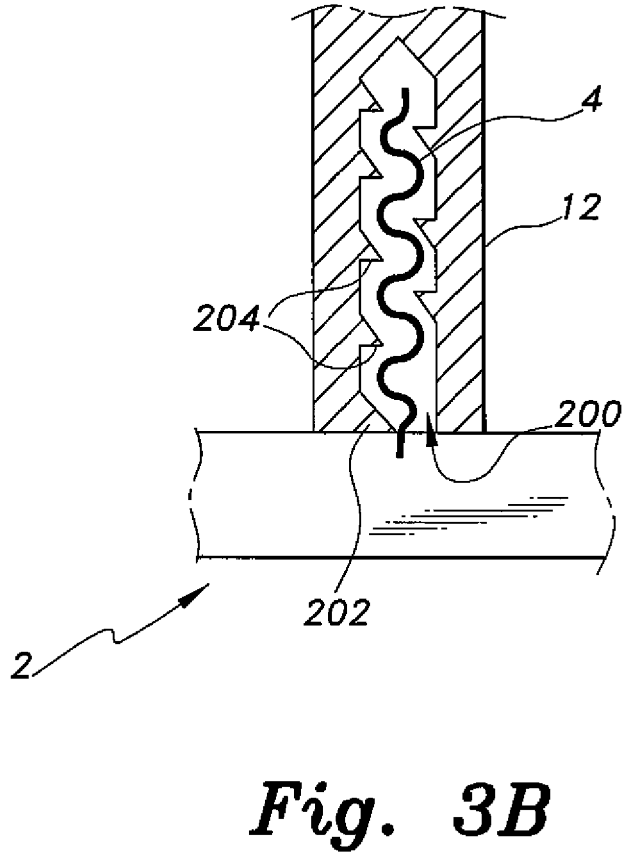
FIG. 3B is a partial side view in section of an alternative embodiment of a connection socket for the utensil attachments for a portable knife assembly according to the present invention.

As best seen in FIG. 3A, in a first embodiment, the connection socket 20 is relatively smooth along its interior length. The inner diameter of the connection socket 20 is preferably sized to provide a snug fit for the corkscrew 4, the corkscrew 4 forming a snap fit or pressure fit in the connection socket 20. In the alternative embodiment shown in FIG. 3B, the connection socket 200 includes internal helical threads 204 that correspond to the helical shape of the corkscrew tool 4, the corkscrew 4 threadably engaging the connection socket 200. The connection socket also includes a lip 202, similar to the lip 22 of FIG. 3A. Preferably, the internal threads 204 closely match the corkscrew spiral of most corkscrew designs. However, the internal threads 204 can also be constructed with more tolerance to increase the range of corkscrew shapes and sizes for using the utensil attachments 10*a*, 10*b*. Alternatively, each handle 12 can be constructed so that a more custom connection fit can be obtained. The connector socket 20, 200 can be filled with a memory retention material, resilient material, clay, plaster and the like that allows the user to manually screw in a select corkscrew without much effort. Memory retention or resilient materials would require a little more physical effort prior to using the desired utensil attachment 10*a*, 10*b*. On the other hand, the clay, plaster or the like material can be used to allow the inserted shape of the corkscrew to set, which provides a more permanent internal thread specific and tailored to the user-selected knife assembly 2.

The above construction of the utensil attachments 10*a*, 10*b* for knife assembly transforms the knife assembly 2 into an easy to manipulate eating utensil for the disabled or those with limited motor control. The elongate body of the knife assembly 2 provides a relatively large handle for easy grasping, which is especially beneficial to those with limited range of movement in their hands. The connection socket 20, 200 allows the user to easily and securely attach the utensil attachment 10*a*, 10*b* to the existing corkscrew 4 in the knife assembly 4, and these utensil attachments 10*a*, 10*b* can be easily carried or stored for use anywhere.

It is to be understood that the utensil attachments 10*a*, 10*b* for knife assembly encompasses a wide range of alternatives. For example, each utensil attachment 10*a*, 10*b* can be constructed from various durable materials, such as wood, plastic, metal, composites and the like. Additionally, the utensil attachments 10*a*, 10*b*, are not limited to the utensils described above. Other tools and utensils such as a "spork" (a combination spoon and fork design), writing instruments, outdoor and indoor tools and the like can be provided with a similar connection socket 20, 200 to facilitate mounting onto an existing corkscrew in knife assemblies.

It is to be understood that the present invention is not limited to the embodiments described above, but encompasses any and all embodiments within the scope of the following claims.

I claim:

1. A utensil attachment for a portable knife assembly, said utensil attachment comprising an elongate handle having a proximal end and a distal end, a utensil head disposed at the distal end of the handle, an entry opening formed in the proximal end of the handle, an elongate connection socket extending from the entry opening toward the distal end of the handle, and a lip extending into the entry opening and forming an acute angle with the longitudinal axis of the elongate connection socket, the lip partially covering the opening and forming an abutment, the connection socket being adapted for mounting onto a corkscrew accessory of the portable knife assembly, the lip being configured for retaining the handle on the corkscrew accessory.

2. The utensil attachment according to claim 1, wherein said utensil head is selected from the group consisting of a spoon bowl and fork tines.

3. The utensil attachment according to claim 1, wherein said connection socket comprises an elongate blind bore having smooth interior sidewalls.

4. A utensil attachment for a portable knife assembly, said utensil attachment comprising:

an elongate handle having a proximal end and a distal end;

a utensil head disposed at the distal end of the handle; and an elongate connection socket defined in the proximal end of the handle;

wherein said connection socket comprises an elongate blind bore having helical interior threads, an entry opening, and a lip partially extending into the opening, the lip forming an abutment;

whereby the connection socket is adapted for mounting onto a corkscrew accessory of the portable knife assembly, and the lip is configured for retaining the handle on the corkscrew accessory.

5. The utensil attachment according to claim 4, wherein said utensil head is selected from the group consisting of a spoon bowl and fork tines.

6. A portable knife assembly, comprising:

a portable knife having a folding corkscrew accessory pivotally attached thereto; and at least one utensil attachment including a handle having a proximal end and a distal end, a utensil head disposed at the distal end of the handle, and an elongate connection socket defined in the proximal end of the handle, the connection socket having an entry opening and a lip extending into the opening, the lip partially covering the opening and forming an abutment, the connection socket being releasably attachable onto the corkscrew accessory of the portable knife assembly, the lip being configured for retaining the handle on the corkscrew accessory.

7. The portable knife assembly according to claim 6, wherein said utensil head is selected from the group consisting of a spoon bowl and fork tines.

8. The portable knife assembly according to claim 6, wherein said connection socket comprises an elongate blind bore having smooth interior sidewalls, the corkscrew accessory forming a snap fit into said connection socket.

9. The portable knife assembly according to claim 6, wherein said connection socket comprises an elongate blind bore having helical interior threads, the corkscrew accessory threadably engaging said connection socket.

* * * * *